US009981345B2

(12) United States Patent
Matsumoto (10) Patent No.: US 9,981,345 B2
(45) Date of Patent: May 29, 2018

(54) LASER PROCESSOR AND HOLE-OPENING PROCESSING METHOD

(71) Applicant: Murata Machinery, Ltd., Kyoto-shi, Kyoto (JP)

(72) Inventor: Keita Matsumoto, Inuyama (JP)

(73) Assignee: Murata Machinery, Ltd. (JP)

( * ) Notice: Subject to any disclaimer, the term of this patent is extended or adjusted under 35 U.S.C. 154(b) by 301 days.

(21) Appl. No.: 14/783,402

(22) PCT Filed: Mar. 31, 2014

(86) PCT No.: PCT/JP2014/059559
§ 371 (c)(1),
(2) Date: Oct. 8, 2015

(87) PCT Pub. No.: WO2014/171325
PCT Pub. Date: Oct. 23, 2014

(65) Prior Publication Data
US 2016/0045984 A1    Feb. 18, 2016

(30) Foreign Application Priority Data

Apr. 19, 2013 (JP) .................................. 2013-088023

(51) Int. Cl.
*B23K 26/38* (2014.01)
*B23K 26/10* (2006.01)
(Continued)

(52) U.S. Cl.
CPC .......... *B23K 26/38* (2013.01); *B23K 26/0876* (2013.01); *B23K 26/10* (2013.01); *B23K 26/389* (2015.10)

(58) Field of Classification Search
CPC ................................ B23K 26/38; B23K 26/08
(Continued)

(56) References Cited

U.S. PATENT DOCUMENTS 4,266,112 A * 5/1981 Niedermeyer ..... B23K 26/0846
219/121.72
5,185,507 A * 2/1993 Yasui .................... B23H 7/065
219/69.12
2006/0221424 A1 10/2006 Utagawa et al.

FOREIGN PATENT DOCUMENTS

CN        1840359 A    10/2006
CN      101450420 A     6/2009
(Continued)

OTHER PUBLICATIONS

International Preliminary Report on Patentability dated Oct. 20, 2015 issued on counterpart PCT application PCT/JP2014/059559.
(Continued)

*Primary Examiner* — Samuel M Heinrich
(74) *Attorney, Agent, or Firm* — DLA Piper LLP (US)

(57) ABSTRACT

A laser processing machine employs a step of forming a pierced hole at a sheet material portion on an inner or outer side of a closed route when a processing to form a hole in the sheet material by cutting along a closed route is carried out. Following this pierced hole a step to perform a cutting process to cut to a predetermined position with a center of the laser beam traversing the closed route and a step of returning, in a condition in which laser irradiation is interrupted, a position of the laser processing head relative to the sheet material to assume a start position lying on the route during a step of cutting to the predetermined position and on the closed route are employed. Thereafter, a step of performing the cutting process from the start position along the closed route is carried out.

4 Claims, 6 Drawing Sheets (51) Int. Cl.
*B23K 26/08* (2014.01)
*B23K 26/382* (2014.01)

(58) Field of Classification Search
USPC ............ 219/121.67–121.72, 121.78, 121.79, 219/121.83
See application file for complete search history.

(56) References Cited

FOREIGN PATENT DOCUMENTS

| | | | |
|---|---|---|---|
| JP | 09220683 | A | 8/1997 |
| JP | 10080783 | A | 3/1998 |

OTHER PUBLICATIONS

Chinese language Office Action dated May 20, 2016 issued in corresponding Chinese patent application No. 201480020868.6.
Office Action dated Jan. 3, 2017 in corresponding Chinese Patent Application No. 201480020868.6.

* cited by examiner

Fig. 7A (PROJECTION FOUND)
CONVENTIONAL PERFORATION

Fig. 7B (NO PROJECTION FOUND)
PERFORATION ACCORDING TO
THE EMBODIMENT

LASER PROCESSOR AND HOLE-OPENING PROCESSING METHOD

CROSS REFERENCE TO THE RELATED APPLICATION

This application is based on and claims Convention priority to Japanese patent application No. 2013-088023, filed Apr. 19, 2013, the entire disclosure of which is herein incorporated by reference as a part of this application.

BACKGROUND OF THE INVENTION

Field of the Invention

The present invention relates to a laser processing machine capable of performing a perforating process by means of cutting applied to a sheet material and a perforating method utilizing such laser processing machine.

Description of Related Art

Figure 8:
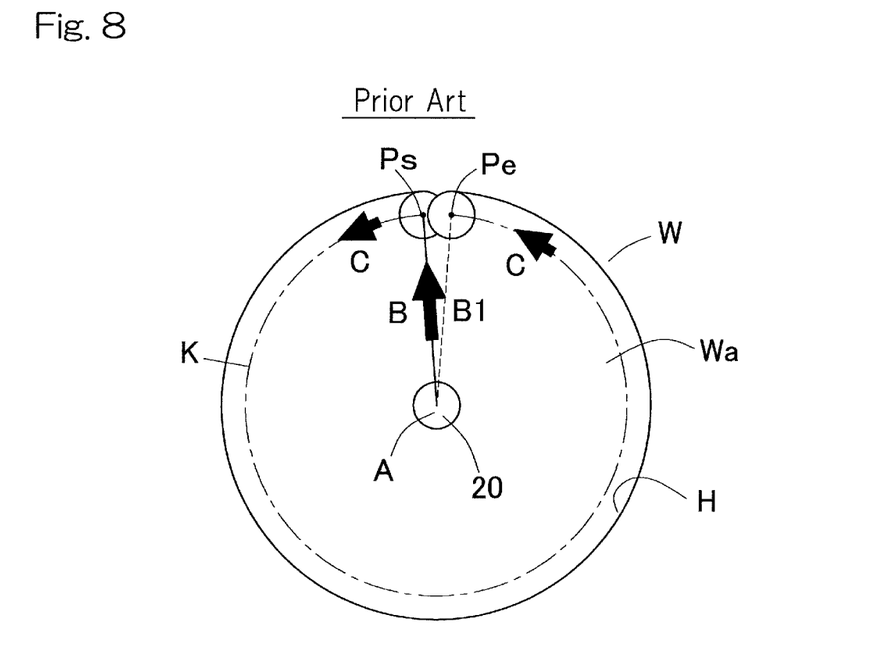
FIG. 8 is an explanatory diagram showing steps of a cutting process applied to form the hole in the sheet material with the use of the conventional laser processing machine.
Figure 9:
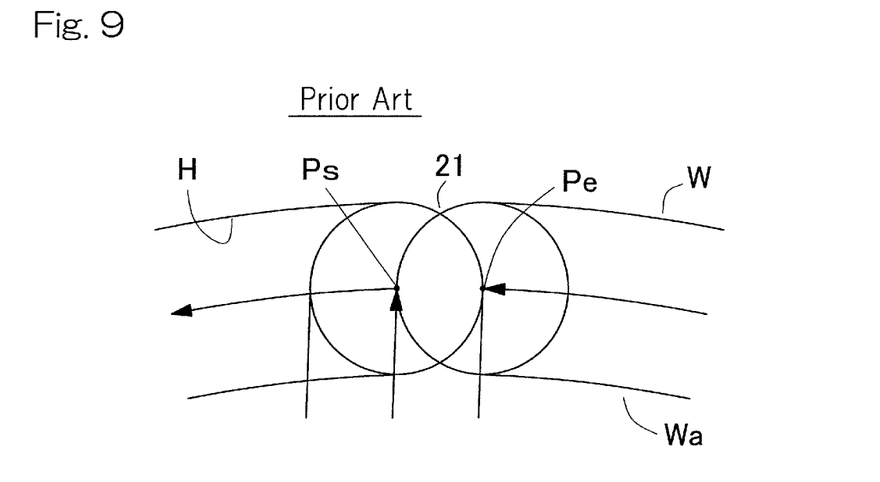
FIG. 9 is a fragmentary enlarged diagram of FIG. 8.

When it comes to formation of a hole of circumferentially closed shape in a sheet material W with the use of a laser processing machine, the conventional perforating method includes, as shown in FIG. 8 of the accompanying drawings, a process step A in which a sheet material portion Wa on an inner side of a processing route K following an inner periphery of a target hole H desired to be formed is perforated to define a pierced hole 20, a process step B in which cutting is applied radially from the pierced hole 20 to the processing route K, and a process step C in which cutting is carried out along the processing route K. In such a perforating method, since the processing route K is defined offset inwardly from an inner peripheral position of the hole H, the processing route tends to become an incompletely closed route, in which a process starting point Ps and a process terminating point Pe do not coincide with each other, The process step B, too, is such that the process starting point is apt to displace towards a left side of the figure of FIG. 8 beyond B1 shown by the broken line. For this reason, a projection 21 protruding inwardly as shown in an enlarged diagram of FIG. 9 remains left in between the processing start point Ps and the processing terminating point Pe both defined in the inner periphery of the apertured hole H. If such a projection 21 remains left as discussed above, an inconvenience would occur in mounting of any other component in the hole H and, therefore, the projection 21 has to be eliminated at a later stage manually. Also, even though the completely closed route is formed in which in the processing route K the processing start position Ps and the processing terminating point Pe coincide with each other, it has been found that the projection 21 is left unremoved on a back surface side of the work W even though the projection 21 on an upper or front surface side of the work W is removed.

Figure 10:
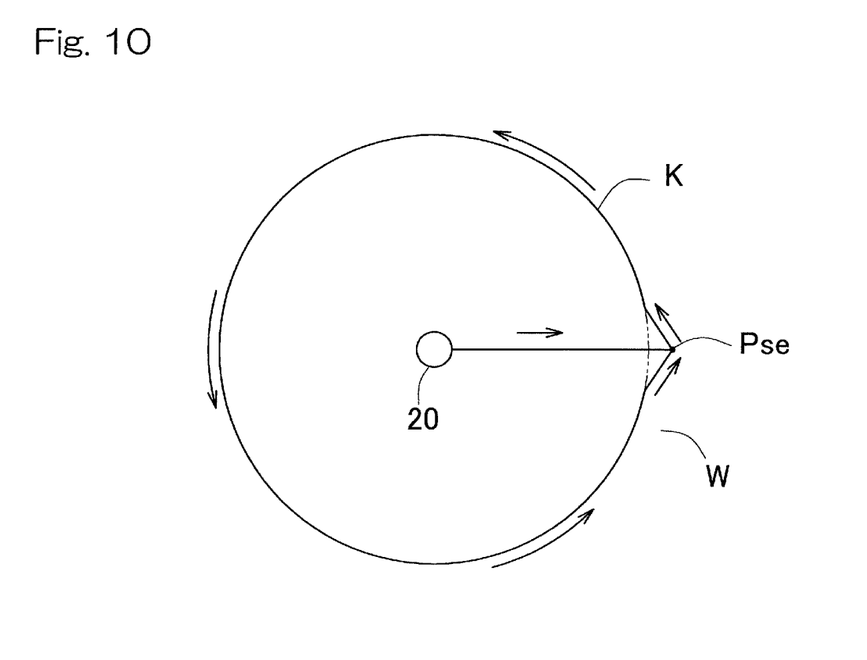
FIG. 10 is an explanatory diagram showing steps of the cutting process applied to form the hole in the sheet material according to the perforating method hitherto suggested.

So that the above discussed projection 21 remains unremoved, a method has been suggested in which, as shown in FIG. 10 of the accompanying drawings, a processing start-terminating point Pse, at which the processing start point and the processing terminating point concurrently lie, is set on an outer side of the processing route K. In this respect, see the patent document 1 listed below. The presence of this suggested perforating method is effective to avoid any possible occurrence of the projections.

PRIOR ART LITERATURE

Patent Document 1: JP Laid-open Patent Publication No. H09-220683

SUMMARY OF THE INVENTION

It has however been fund that the perforating method disclosed in the above mentioned patent publication 1 is susceptible to thermal concentration at a site in the vicinity of the processing start-terminating point Pse and, hence, to deposition of dross in the rear surface of the sheet material W. Also, if the cutting process takes place at a high speed, a highly precise perforation is difficult to achieve in view of the characteristics of a moving mechanism.

In view of the foregoing, the present invention has for its primary object to provide a laser processing machine capable of accomplishing a high speed, highly precise perforation with no projection induced and, hence, with no post processing such as, for example, removal of the projection being required and with deposition of the dross as a result of thermal concentration being avoided.

A specific laser processing machine designed in order to substantially eliminate the foregoing inconveniences and problems in accordance with the present invention will now be described below with the aid of reference numerals employed in the accompanying drawings. In one aspect of the present invention, a laser processing machine according to the present invention is equipped with a laser processing head (4) to project a laser beam for thermal cutting purpose towards a sheet material (W) which forms a target of processing, a laser oscillator (5) to oscillate the laser beam to be projected from the laser processing head (4), a moving mechanism (6) to relatively move the laser processing head (4) relative to the sheet material (W) and a control device (2) to control the laser oscillator (5) and the moving mechanism (6). The control device (2) includes a perforation control unit (2a) to perform a control of sequentially executing a step of forming a pierced hole (20) at an arbitrary site of a sheet material portion (Wa) on an inner or outer side of a closed route (K1) when a processing to form a hole (H) in the sheet material (W) by means of a cutting along a closed route (K1) is carried out; a step, subsequent to the pierced hole (20), to perform a cutting process to cut to a predetermined position (Q1) with a center of the laser beam traversing the closed route (K1); a step of returning, in a condition in which laser irradiation is interrupted, a position of the laser processing head (4) relative to the sheet material (W) to assume a start position (Q2) lying on the route during a step of cutting to the predetermined position (Q1) and on the closed route (K1); and a step of performing the cutting process from the start position (Q2) along the closed route (K1).

According to the above described aspect of the present invention, by the control executed by the perforation control unit (2a) of the control device (2), the cutting process to cut to the predetermined position (Q1) where the center of the laser beam reach over the closed route (K1) and, accordingly, the cut can be assuredly made to the inner peripheral lower portion (rear surface side) of the hole (H) that is formed during the subsequent processing. For this reason, by performing the cutting process subsequently along the closed route (K1), that portion, which will form the projection (21), can be cut by the cutting at the inner peripheral lower portion of the hole and, hence, the smooth hole (H) having no projection (21) can be apertured. Therefore, no post-treatment to remove the projection (21) is needed.

Also, by interrupting the laser irradiation at the time the laser processing head (4) is returned to the start position (Q2) on the closed route (K1) after the cutting has been made to the predetermined position (Q1), the thermal concentration can be suppressed and, hence, an undesirable deposition of dross can be prevented. By so doing the perforating process in the manner described above, a high speed and highly precise perforating process can be accomplished with no projection (21) formed and, hence, not only is any post-treatment such as, for example, removal of the projection (21) eliminated, but any undesirable deposition of dross is also prevented.

In a preferred embodiment of the laser processing machine of the present invention, the perforating control unit (2a) may retard a moving speed of the laser processing head (4) within a certain distance subsequent to the start of processing in the step of performing the cutting process along the closed route (K1) and within a certain distance preceding termination of the processing. Also, by way of example, if the sheet material (W) has a large plate thickness, the moving speed is lowered.

The drag line for the thermal cutting process with the use of the laser beam is lagged in the direction of advance of the laser beam in a lower surface side of the sheet material (W). This lag is large as the plate thickness of the sheet material (W) is large and, at the same time, the processing velocity is high. For this reason, when the plate thickness of the sheet material (W) is large, there is the possibility that the projection (21) may be formed without being cut off in the lower surface side of the sheet material (W) in the vicinity of the start position (Q2). With the moving speed of the laser processing head (4) being lowered, the lag of the cutting in the direction of advance of the laser beam can be eliminated or reduced. As a result, formation of the projection (21) can be avoided. Since the lowering of the moving speed of the laser processing head (4) is effected only within the certain distance subsequent to the start of processing and within the certain distance preceding termination of the processing, no increase of the length of time of the processing occurs.

In the present invention, there is also provided a perforating method of forming a hole (H) in a sheet material (W) by means of a cutting process along a closed route (K1) with the use of a laser processing machine equipped with a laser processing head (4) to project a laser beam for thermal cutting purpose towards a sheet material (W) which forms a target of processing, a laser oscillator (5) to oscillate the laser beam to be projected from the laser processing head (4), a moving mechanism (6) to relatively move the laser processing head (4) relative to the sheet material (W) and a control device (2a) to control the laser oscillator (5) and the moving mechanism (6). In the perforation method the following steps are sequentially executed. That is, a step of forming a pierced hole (20) at an arbitrary site of a sheet material portion (Wa) on an inner or outer side of the closed route (K1), a step, following to the pierced hole (20), to perform a cutting process to cut to a predetermined position (Q1) with a center of the laser beam traversing the closed route (K1); a step of returning, in a condition in which laser irradiation is interrupted, a position of the laser processing head (4) relative to the sheet material (W) to assume a start position (Q2) lying on the route during a step of cutting to the predetermined position (Q1) and on the closed route (K1); and a step of performing the cutting process from the start position (Q2) along the closed route (K1).

Even with this method, effects similar to those brought about by the laser processing machine of the type discussed above can be obtained.

In a preferred embodiment of the perforating method of the present invention, the moving speed of the laser processing head (4) may be retarded within a certain distance subsequent to the start of processing in a step of performing the cutting process along the closed route (K1) and within a certain distance preceding termination of the processing. By the reason similar to that discussed hereinbefore, by lowering the moving speed of the laser processing head (4), the lag of the cutting in the direction of advance of the laser beam can be eliminated or reduced. Accordingly, the formation of the projections (21) can be avoided. Since the lowering of the moving speed of the laser processing head (4) is effected only within the certain distance subsequent to the start of processing and within the certain distance preceding termination of the processing, no increase of the length of time of the processing occurs.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Figure 1:
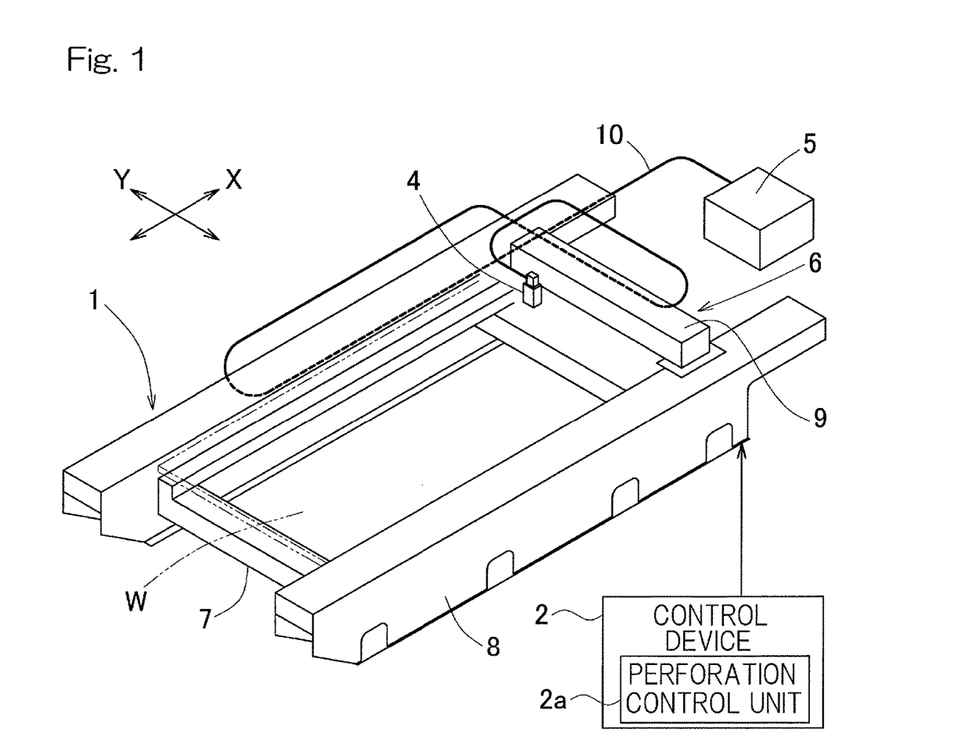
FIG. 1 is a diagram comprised of a perspective view a general outline of a laser processing machine according to a preferred embodiment of the present invention, shown together with a block diagram of a control system thereof.

One preferred embodiment of the present invention will now be described in detail with particular reference to the accompanying drawings. As shown in FIG. 1, a laser processing machine according to the present invention includes a machine main body 1 and a control device 2 for performing a control of the machine main body 1.

The machine main body 1 includes a laser processing head 4, a laser oscillator 5, a sheet material support member 7 for supporting a plate member W which becomes a work, and a moving mechanism 6 for relatively moving the laser processing head 4 relative to the sheet material support member 7. In the illustrated embodiment of the present invention, the sheet material support member 7 is on a stationary side and the laser processing head 4 is on a movable side and, hence, the laser processing head 4 is moved by the moving mechanism 6 relative to the sheet material support member 7. The sheet material W is in the form of, for example, a steel plate and has, for example, a rectangular shape when viewed from top.

The moving mechanism 6 is of such a design that the laser processing head 4 is mounted on a forward and rearward movable table 9, which is mounted on a base table 8 for movement in a forward and rearward direction (X-axis direction), for movement in a leftward and rightward direction (Y-axis direction) through a leftward and rightward movable body (not shown), and includes a motor (not shown) for effecting the respective movements in the forward and rearward direction and the leftward and rightward direction. The sheet material support member 7 is fixed to the base table 8. It is to be noted that the laser processing head 4 itself, or the leftward and rightward movable body supporting the laser processing head 4, is provided with an elevating mechanism (not shown) that is driven by a drive source (not shown) to selectively descend and ascend the laser processing head 4.

To the laser processing head 4, a laser beam oscillated by the laser oscillator 5 is transmitted through a laser beam transmission path 10. The laser oscillator 5 may be either a solid state laser oscillator such as, for example, fiber laser, or a gas laser oscillator such as, for example, $CO_2$ laser, but the illustrated embodiment now under discussion is assumed to make use of the solid state laser oscillator.

The control device 2 includes, for example, a computer type numerical control device and a programmable controller and performs a control of the machine main body 1 according to a processing program (not shown). The control device 2 includes various control units (not shown) that perform various processing routines in accordance with a series of commands issued by the processing program. One of those control units referred to above includes a perforation control unit 2a for performing a perforating process to form a hole in the sheet material W according to a cutting process in a closed route. The perforation control unit 2a referred to above, although it performs the perforating process by controlling the laser oscillator 5 and the moving mechanism 6, also performs a control of the laser processing head 4, for example, injection and halt of an assist gas during the practice of this perforating process, the description of which has been omitted here.

It is to be noted that when, after having prepared a new command necessary for the perforation control unit 2a to perform a series of controls, the control device 2 reads out such command from the processing program, a function of issuing such command to perform the above described series of operations to the laser oscillator 5 and the moving mechanism 6 may be provided.

Figure 2:
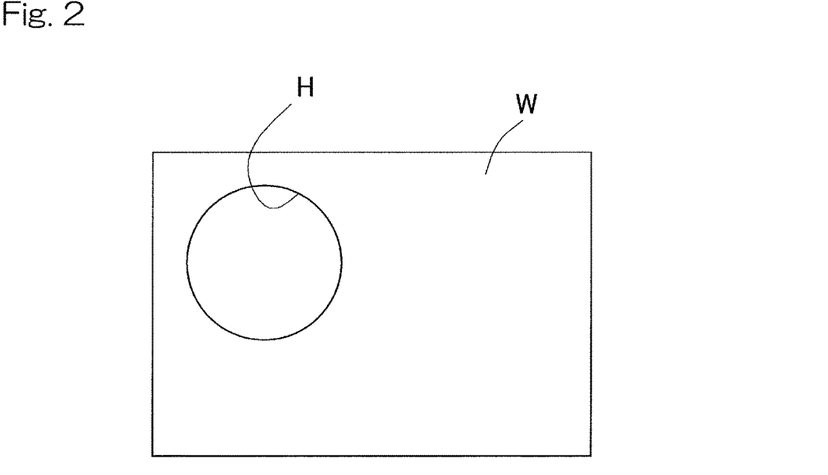
FIG. 2 is a top plan view of a sheet material having a hole defined therein.

The perforating process under the control of the perforation control unit 2a will now be described in detail by way of the formation of a round hole H in the sheet material W as shown in FIG. 2. In this example, the hole H to be formed is of a round shape, but it may be of any shape, for example, rectangular, that is perforated by the cutting process of the closed route. A pierced hole may also lie outside the closed processing route.

Figure 3:
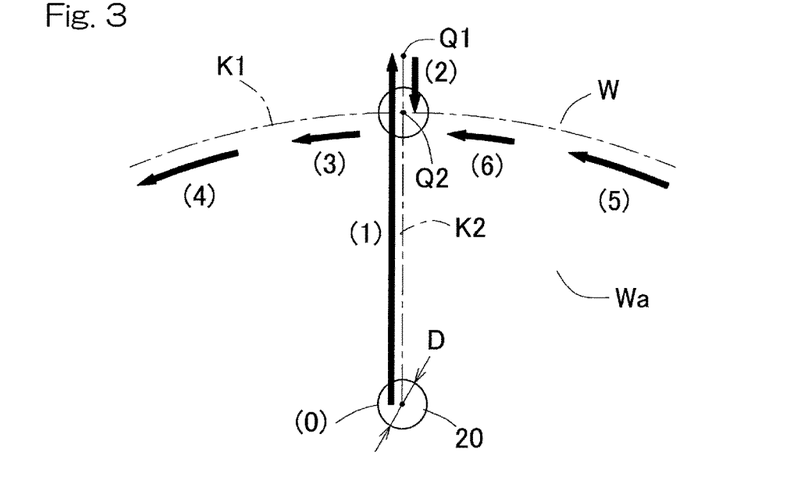
FIG. 3 is an explanatory diagram showing the manner of perforating in the sheet material with the use of the laser processing machine of the present invention according to a closed route cutting technique.

As shown in FIG. 3, at step 0, the pierced hole 20 is formed at an arbitrary site in a plate portion Wa on an inner side of the closed route K1 which forms the processing route. The closed route K1 referred to above is a path through which a laser beam is moved to accomplish an intended cutting process of the hole H, and is represented by a curve lying from an inner periphery of the intended hole H to a position spaced a distance corresponding to half of the spot diameter D of the laser beam.

Then, by means of the cutting process, cutting is made at step (1) along an approach route K2 to a predetermined position Q1 at which the center of the laser beam traverses over the closed route K1 from the pierced hole 20. The distance from the closed route K1 to the predetermined position Q1 may be sufficiently chosen to be ½ or more of the spot diameter D and may be set to an arbitrary distance. Subsequently, as shown in FIG. 3, the position of the laser processing head 4 on the sheet material W is returned at step (2) to a start position Q2 on the route of the approach route K2 and on the closed route K1 in a condition in which the laser irradiation is halted.

Thereafter, the laser processing head 4 is moved around one time from the start position Q2 to perform the cutting process as at steps (3) to (6). During those steps, moving speed of the laser processing head 4 is changed in dependence on the plate thickness of the sheet material W. In other words, as shown in Table 1 below, if the sheet material W is a thin plate, the laser processing head 4 is moved at a high speed from start to finish, but if the sheet material W is a thick plate, the laser processing head 4 is moved at a low speed within a certain distance (step (3) subsequent to the start of the processing and also within a certain distance (step (6) preceding the termination of the processing. It is to be noted that the terms "thick" and "thin" referred to above are relative terms to denote the sheet materials used in this example.

TABLE 1

|  | Step | | | | | |
| --- | --- | --- | --- | --- | --- | --- |
|  | (1) | (2) | (3) | (4) | (5) | (6) |
| Thin Plate | Low | (Low)* | High | High | High | High |
| Thick Plate | Low | (Low)* | Low | High | High | Low |

*irradiation off

According to the above described perforating process, when at step (1) above cutting is carried out until the center of the laser beam moves over the closed route K1 to the predetermined position Q1, cut can be assuredly made to an inner peripheral lower portion (rear surface side) of the hole H that is formed during the subsequent processing. In other words, at the inner peripheral lower portion of the hole H a thermal cutting is lagged as compared with an inner peripheral upper portion and, hence, the cut is small, but as the cutting process to cut is carried out to the predetermined position Q1 over the closed route K1 as discussed above, the cut is assuredly formed to the inner peripheral lower portion of the hole H at a site 22 shown by a bold line in FIG. 4.

Figure 4:
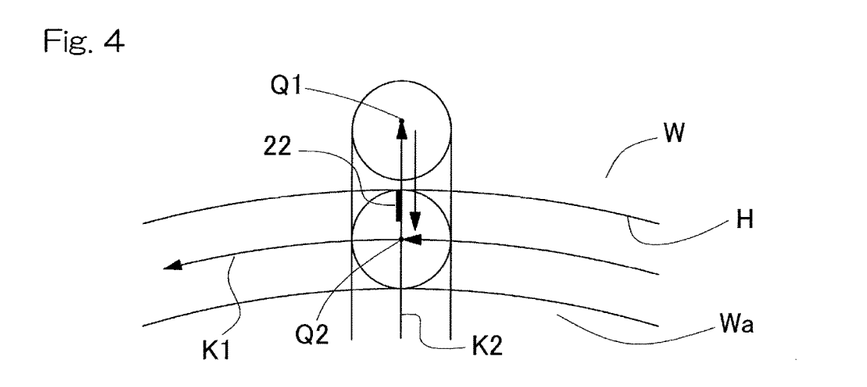
FIG. 4 is a fragmentary enlarged view of FIG. 3.

Although the site 22 referred to above is a site left as a portion of projection according to the conventional processing, if the cut is assuredly provided as hereinbefore described, the subsequent cutting process along the closed route K1 makes it possible that a portion, which forms the projection in the conventional processing, is cut off by the cut in the inner peripheral lower portion of the hole and, hence, a smooth hole H having no projection can be perforated. Accordingly, no post-treatment such as, for example, removal of the projection is needed. Also, when after the cutting process to cut to the predetermined position Q1, the laser irradiation is halted at the time the laser processing head 4 is returned to the start position Q2 on the closed route K1, the thermal concentration can be suppressed and deposition of dross can be avoided. By so conducting the perforating process, the perforating process can be accomplished at a high speed and highly precisely with no projection resulting in, and, therefore, the post processing such as, for example, the removal of the projection is not needed and the deposition of dross resulting from the thermal concentration can be avoided.

Figure 5:
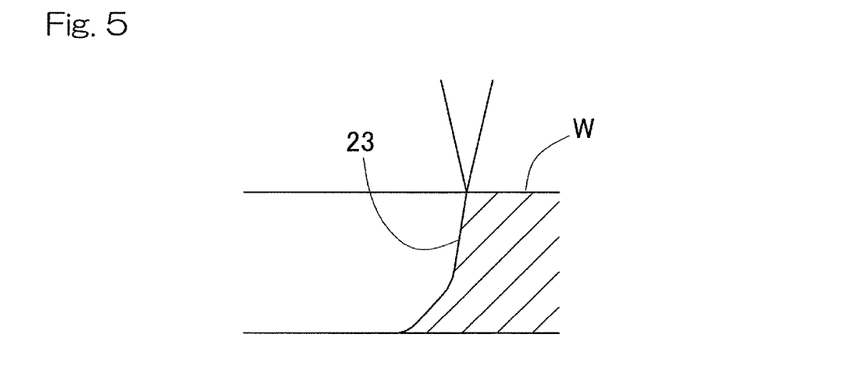
FIG. 5 is a sectional view of the sheet material under a laser cutting process.

As shown in FIG. 5, the drag line for the heat cutting process with the laser beam is lagged in a lower surface side of the sheet material W with respect to the direction of advance of the laser beam. This lag is large when the plate thickness of the sheet material W is large or the processing speed is high. For this reason, when the sheet material W has a large plate thickness, there is the possibility that projections, which are left uncut, are formed in the vicinity of a portion of a lower surface of the sheet material W adjacent the start position Q2. However, if the moving speed of the laser processing head 4 is lowered within the certain distance subsequent to the start of the processing and also within the certain distance preceding the termination of the processing such as practiced in the perforating method of the present invention, it is possible to avoid or reduce the lag in the direction of advance of the laser beam. Accordingly, formation of the projections referred to above can be avoided. Since the lowering of the moving speed of the laser processing head 4 takes place within the certain distance prior to the start of the processing and also within the certain distance preceding the termination of the processing, the length of the processing time is little increased.

Figure 6:
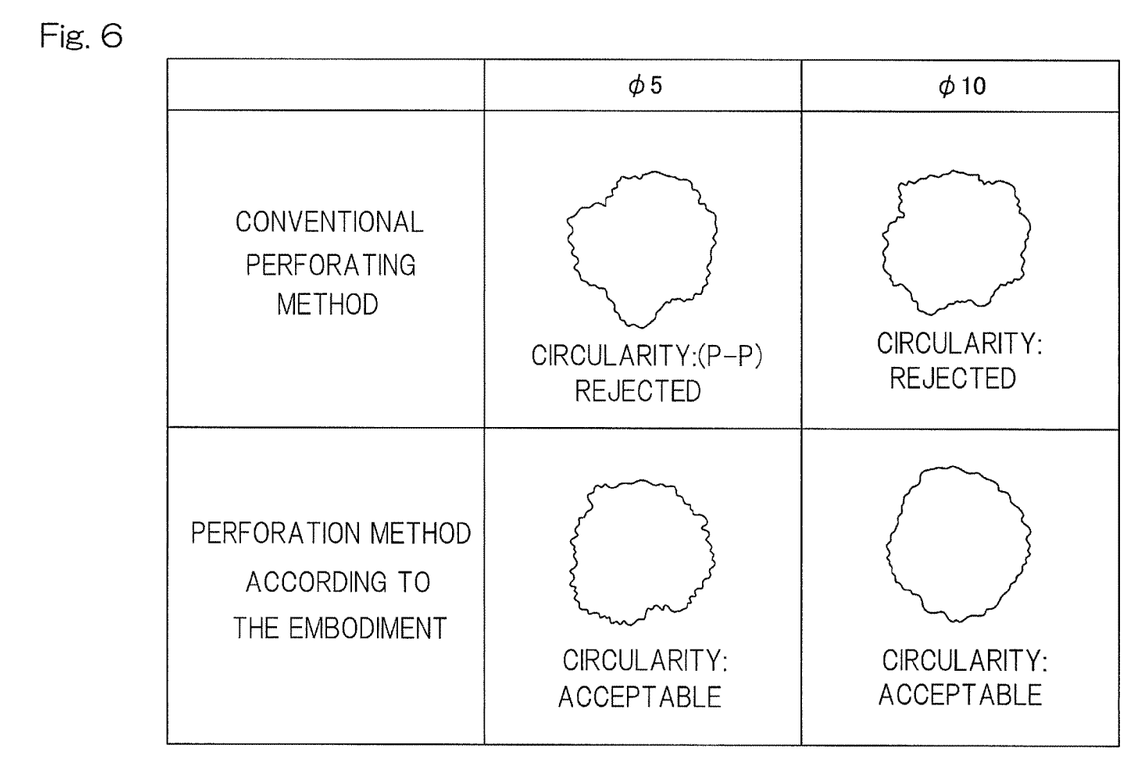
FIG. 6 is an explanatory diagram showing a comparison table in which round holes formed according to the conventional technique and those formed according to the use of the laser processing machine of the present invention are compared.

Results obtained when the processing is done according to the perforating method hereinbefore described in connection with the embodiment of the present invention, and results obtained when the processing is done according to the conventional perforating method are shown in FIG. 6. FIG. 6 illustrates those results on the shape when a round hole of 5 mm in diameter and a round hole of 10 mm in diameter are formed. In this figure, the scale of the length in a diametric direction relative to that of the length in a circumferential direction is shown exaggerated. As can readily be understood from FIG. 6, the processing according to the perforating method shown and described in connection with this embodiment of the present invention has exhibited a higher circularity than that exhibited by the processing according to the conventional perforating method.

Figure 7A:
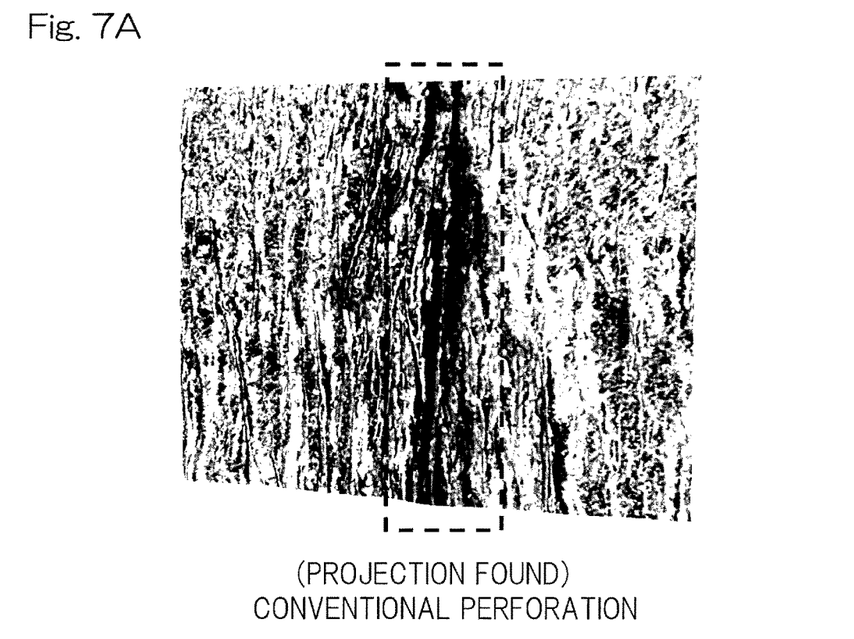
FIG. 7A is a photomicrograph showing the shape of the round hole formed according to the conventional technique.
Figure 7B:
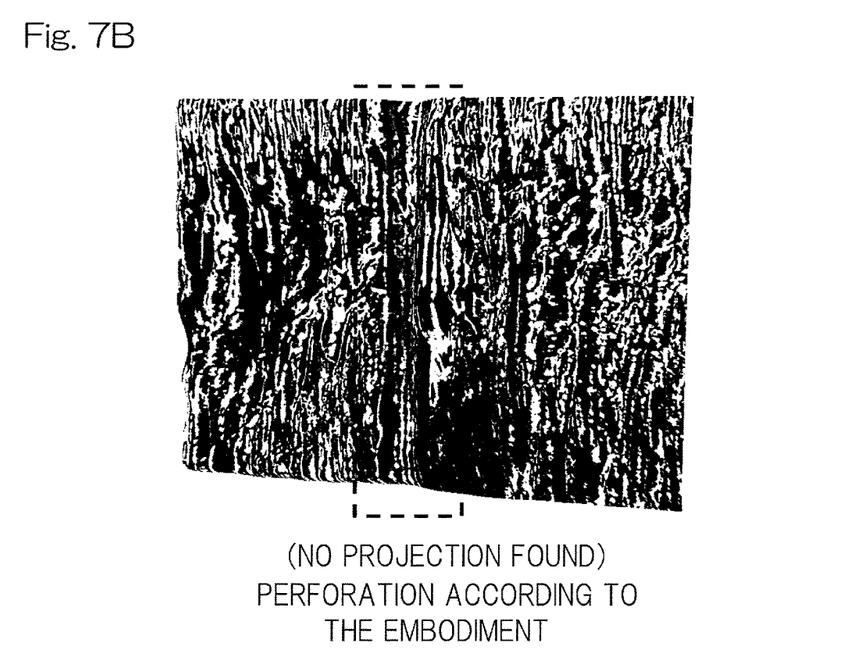
FIG. 7B is a photomicrograph showing the shape of the round hole formed with the use of the laser processing machine of the present invention, shown for the comparison with FIG. 7A.

Also, photomicrographs showing the sectional shape of the hole formed according to the perforating method, shown and described in connection with this embodiment of the present invention, and that according to the conventional perforating method are shown in FIGS. 7A and 7B. Specifically, the sectional representation of the hole formed according to the conventional perforating method is shown in FIG. 7A, whereas the sectional representation of the hole formed according to the perforating method in this embodiment of the present invention is shown in FIG. 7B. As can readily be understood from the photomicrographs, the conventional perforating method has resulted in formation of the projections in an inner surface of the hole whereas the perforating method according to this embodiment has resulted in the absence of any projection.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

| [Reference Numerals] | |
| --- | --- |
| 1 | Machine main body |
| 2 | Control device |
| 2a | Perforation control unit |
| 4 | Laser processing head |
| 5 | Laser oscillator |
| 6 | Moving mechanism |
| 20 | Pierced hole |
| H | Hole |
| K1 | Closed route |
| Q1 | Predetermined position |
| Q2 | Start position |
| W | Sheet material |
| Wa | Sheet material portion |

What is claimed is:

1. A laser processing machine equipped with a laser processing head to project a laser beam for thermal cutting purpose towards a sheet material which forms a target of processing, a laser oscillator to oscillate the laser beam to be projected from the laser processing head, a moving mechanism to relatively move the laser processing head relative to the sheet material and a control device to control the laser oscillator and the moving mechanism, in which machine:

the control device includes a perforation control unit to perform a control of sequentially executing a step of forming a pierced hole at an arbitrary site of a sheet material portion on an inner or outer side of a closed route when a processing to form a hole in the sheet material by means of a cutting along a closed route is carried out; a step, subsequent to the pierced hole, to perform a cutting process to cut to a predetermined position with a center of the laser beam traversing the closed route; a step of returning, in a condition in which laser irradiation is interrupted, a position of the laser processing head relative to the sheet material to assume a start position lying on the closed route, along the route during a step of cutting to the predetermined position;

and a step of performing the cutting process from the start position along the closed route.

2. The laser processing machine of claim 1, in which the perforating control unit retards a moving speed of the laser processing head within a certain distance subsequent to the start of processing in the step of performing the cutting process along the closed route and within a certain distance preceding termination of the processing.

3. A perforating method of forming a hole in a sheet material by means of a cutting process along a closed route with the use of a laser processing machine equipped with a laser processing head to project a laser beam for thermal cutting purpose towards a sheet material which forms a target of processing, a laser oscillator to oscillate the laser beam to be projected from the laser processing head, a moving mechanism to relatively move the laser processing head relative to the sheet material and a control device to control the laser oscillator and the moving mechanism; which method comprises a step of forming a pierced hole at an arbitrary site of a sheet material portion on an inner or outer side of a closed route when a processing to form a hole in the sheet material by means of a cutting along a closed route is carried out; a step, subsequent to the pierced hole, to perform a cutting process to cut to a predetermined position with a center of the laser beam traversing the closed route; a step of returning, in a condition in which laser irradiation is interrupted, a position of the laser processing head relative to the sheet material to assume a start position lying on the closed route, along the route during a step of cutting to the predetermined position; and a step of performing the cutting process from the start position along the closed route.

4. The perforating method of claim 3, in which a moving speed of the laser processing head is retarded within a certain distance subsequent to the start of processing in a step of performing the cutting process along the closed route and within a certain distance preceding termination of the processing.

* * * * *